(12) United States Patent
Liu et al.

(10) Patent No.: US 12,306,501 B2
(45) Date of Patent: May 20, 2025

(54) ARRAY SUBSTRATE AND MANUFACTURING METHOD THEREFOR, DISPLAY PANEL, AND DISPLAY DEVICE

(71) Applicants: Hefei BOE Display Technology Co., Ltd., Anhui (CN); BOE Technology Group Co., Ltd., Beijing (CN)

(72) Inventors: Zexu Liu, Beijing (CN); Jincheng Gao, Beijing (CN); Xiang Li, Beijing (CN); Tao Wang, Beijing (CN); Lixing Zhao, Beijing (CN); Shuhan Liu, Beijing (CN); Guanyong Zhang, Beijing (CN); Wentao Lu, Beijing (CN); Jia Zhang, Beijing (CN)

(73) Assignees: Hefei BOE Display Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/644,012

(22) Filed: Apr. 23, 2024

(65) Prior Publication Data
US 2024/0272502 A1 Aug. 15, 2024

Related U.S. Application Data

(63) Continuation of application No. PCT/CN2023/076132, filed on Feb. 15, 2023.

(51) Int. Cl.
*G02F 1/1343* (2006.01)
*G02F 1/1337* (2006.01)

(52) U.S. Cl.
CPC .. *G02F 1/134309* (2013.01); *G02F 1/133707* (2013.01); *G02F 1/13439* (2013.01); *G02F 2201/122* (2013.01); *G02F 2201/123* (2013.01)

(58) Field of Classification Search
CPC ............ G02F 1/1368; G02F 1/134309; G02F 2201/123; G02F 2201/122; G02F 1/133707; G02F 1/13439
See application file for complete search history.

(56) References Cited

U.S. PATENT DOCUMENTS

2013/0043477 A1\* 2/2013 Jang .................. G02F 1/134363
438/30
2013/0155358 A1\* 6/2013 Kim .................. G02F 1/134363
349/110
(Continued)

FOREIGN PATENT DOCUMENTS

CN 102955301 A 3/2013
CN 103163693 A 6/2013
(Continued)

*Primary Examiner* — Jia X Pan
(74) *Attorney, Agent, or Firm* — IPro, PLLC

(57) ABSTRACT

Provided are an array substrate and a manufacturing method therefor, a display panel, and a display device. The array substrate includes: a plurality of electrodes arranged in an array. The electrode includes a plurality of strip electrodes that are connected to each other and spaced. The plurality of strip electrodes at least have two thicknesses. A distance between two adjacent strip electrodes is less than a preset value. During manufacturing, a mask used for forming each layer of sub-electrodes includes a plurality of strip-shaped shading regions that are connected to each other and spaced in a first direction. Strip-shaped shading regions in a mask used for sub-electrodes formed subsequently are integrally shifted by a first distance in the first direction relative to strip-shaped shading regions in a mask used for sub-electrodes formed last time.

20 Claims, 9 Drawing Sheets

(56) References Cited

U.S. PATENT DOCUMENTS

2020/0183179 A1\* 6/2020 Wang ...................... G02F 1/137
2022/0093408 A1\* 3/2022 Zhang .................. H10B 12/485

FOREIGN PATENT DOCUMENTS

| CN | 106024808 | A | 10/2016 |
| CN | 208297894 | U | 12/2018 |
| CN | 114203628 | A | 3/2022 |
| KR | 20090036867 | \* | 4/2009 |
| KR | 20090036867 | A | 4/2009 |
| KR | 20120037668 | A | 4/2012 |

\* cited by examiner

ARRAY SUBSTRATE AND MANUFACTURING METHOD THEREFOR, DISPLAY PANEL, AND DISPLAY DEVICE

CROSS REFERENCE TO RELATED APPLICATION

This application is a continuation of International Application No. PCT/CN2023/076132 filed Feb. 15, 2023, the entire contents of which are incorporated herein by reference.

TECHNICAL FIELD

The disclosure relates to the technical field of display, in particular to an array substrate and a manufacturing method therefor, a display panel, and a display device.

BACKGROUND

As the living standards are improved, consumers demand increasingly higher contrast ratio and transmittance of display products.

Advanced super dimension switch (ADS) structure products are lower in contrast and transmittance due to the difference in design structure from in-plane switching (IPS) and vertical alignment (VA) products.

In view of this, how to improve the transmittance of display products has become a pressing technical problem.

SUMMARY

Embodiments of the disclosure provide an array substrate and a manufacturing method therefor, a display panel, and a display device to solve the problems existing in the prior art.

In a first aspect, embodiments of the disclosure provide an array substrate in order to solve the above technical problems. The array substrate includes: a plurality of electrodes arranged in an array.

The electrode includes a plurality of strip electrodes that are connected to each other and spaced. The plurality of strip electrodes at least have two thicknesses. A distance between two adjacent strip electrodes is less than a preset value.

In a possible implementation, the plurality of strip electrodes constitute a plurality of strip electrode groups arranged repeatedly in an arrangement direction of the plurality of strip electrodes.

Thicknesses of the strip electrodes in the strip electrode group gradually increase or decrease in an arrangement mode of the plurality of strip electrodes.

In a possible implementation, a thickness difference between two adjacent strip electrodes in the strip electrode group ranges from 50 Å to 800 Å.

In a possible implementation, a distance between two adjacent strip electrodes is substantially identical in the arrangement direction of the plurality of strip electrodes.

In a possible implementation, the electrode further includes a frame.

Two ends of the strip electrodes are connected to the frame separately.

In a possible implementation, the frame has different thicknesses in different regions, and a number of thickness types of the frame is greater than a number of thickness types of the plurality of strip electrodes.

In a possible implementation, a thickness of a thickest position of the frame is a sum of thicknesses corresponding to all thickness types included in the plurality of strip electrodes.

In a possible implementation, the preset value is less than 4 μm.

In a second aspect, the disclosure provides a manufacturing method for an array substrate. The manufacturing method includes:

providing a substrate; and forming at least two layers of sub-electrodes having different thicknesses on a side of the substrate continuously, where a mask used for forming each layer of sub-electrodes includes a plurality of strip-shaped shading regions that are connected to each other and spaced in a first direction, and strip-shaped shading regions in a mask used for sub-electrodes formed subsequently are integrally shifted by a first distance in the first direction relative to strip-shaped shading regions in a mask used for sub-electrodes formed last time.

In a possible implementation, the forming at least two layers of sub-electrodes having different thicknesses on a side of the substrate continuously includes:

a forming method for any two adjacent layers of sub-electrodes, including:

forming a first electrode layer having a first thickness;

obtaining a plurality of sub-electrodes corresponding to the first electrode layer by patterning the first electrode layer with a first mask, where the sub-electrodes include a plurality of strip electrodes connected to each other and arranged in the first direction;

forming a second electrode layer having a second thickness on a side of the plurality of sub-electrodes of the first electrode layer away from the substrate; and obtaining a plurality of sub-electrodes corresponding to the second electrode layer by patterning the second electrode layer with a second mask.

In a possible implementation, the patterning the first electrode layer with a first mask includes:

forming a first photoresist layer on a side of the first electrode layer away from the substrate;

exposing the first photoresist layer with a first exposure amount for a first duration based on the first mask;

etching the first electrode layer based on the exposed first photoresist layer; and stripping the exposed first photoresist layer, and annealing the etched first electrode layer.

In a possible implementation, the second electrode layer is patterned with a shifted mask as follows:

forming a second photoresist layer on a side of the second electrode layer away from the substrate;

exposing the second photoresist layer with a second exposure amount for a second duration based on the shifted mask, where the second exposure amount is less than the first exposure amount, and the second duration is shorter than the first duration;

etching the second electrode layer based on the exposed second photoresist layer; and stripping the exposed second photoresist layer, and annealing the etched second electrode layer.

In a possible implementation, after the stripping the exposed first photoresist layer and before the annealing the etched first electrode layer, the method further includes:

forming a third photoresist layer on a surface of a side of the etched first electrode layer away from the substrate;

shifting the first mask by a second distance relative to a previous position in the first direction, and etching the third photoresist layer with the first exposure amount based on the shifted first mask, where the second distance is less than a width of the strip-shaped shading region;

etching the etched first electrode layer based on the exposed third photoresist layer; and stripping the exposed third photoresist.

After the stripping the exposed second photoresist layer and before the annealing the etched second electrode layer, the method further includes:

forming a fourth photoresist layer on a surface of a side of the etched second electrode layer away from the substrate;

shifting the second mask by the second distance relative to a previous position in the first direction, and etching the fourth photoresist layer with the second exposure amount based on the shifted second mask;

etching the etched second electrode layer based on the exposed fourth photoresist layer; and stripping the exposed fourth photoresist layer.

In a possible implementation, the first mask and the second mask are a same mask.

The second mask is shifted by the first distance relative to the first mask in the first direction.

In a possible implementation, the first mask and the second mask are different mask.

In the first direction, a plurality of strip-shaped shading regions in the second mask are shifted by the first distance relative to a plurality of strip-shaped shading regions in the first mask.

In a possible implementation, the first distance is a ratio of a distance between two adjacent strip-shaped shading regions in the mask in the first direction to a number of layers of the sub-electrodes.

In a third aspect, the disclosure provides a display panel. The display panel includes the array substrate according to the first aspect.

In a fourth aspect, the disclosure provides a display device. The display device includes the display panel according to the third aspect.

DETAILED DESCRIPTION

Figure 1:
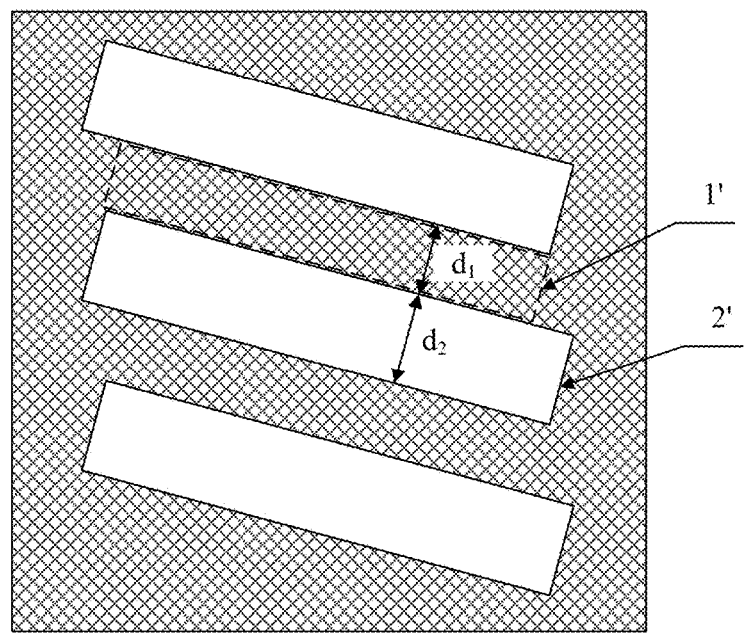
FIG. 1 is a schematic diagram of a distance between strip electrodes in a pixel electrode.

Embodiments of the disclosure provide an array substrate, a manufacturing method for the array substrate, a display panel, and a display device to solve the problems existing in the prior art.

To make the foregoing objective, features, and advantages of the disclosure clearer and more comprehensible, the disclosure will be further described in detail below in conjunction with the accompanying drawings and embodiments. However, the illustrative implementations can be implemented in various forms, and should not be construed as being limited to those described herein. On the contrary, these implementations are provided to make the disclosure comprehensive and complete and to fully convey the concept manifested therein to those skilled in the art. The same reference numerals in the drawings denote the identical or similar parts, and thus repeated descriptions thereof will be omitted. The words expressing positions and directions described in the disclosure are all illustrated by way of example in the accompanying drawings, but can also be changed according to needs, and all the changes are included in the scope of protection of the disclosure. The accompanying drawings of the disclosure are merely for purposes of illustrating relative positional relations and are not intended to represent true proportions.

It should be noted that specific details are set forth in the following description to facilitate a thorough understanding of the disclosure. However, the disclosure can be practiced in many other ways than those described herein, and those skilled in the art may make similar developments without departing from the meaning of the disclosure. The disclosure is therefore not limited to the specific implementations disclosed below. While the description describes preferred implementations as follows for practicing the present application, the description is intended to illustrate the general principles of the present application and is not intended to limit the scope of the present application. The scope of protection of the present application shall be subject to what is defined by the appended claims.

FIG. 1 is a schematic diagram of a distance between strip electrodes in a pixel electrode.

The pixel electrode includes strip electrodes 1'. A gap 2' is between two adjacent strip electrodes 1'. A distance between two adjacent strip electrodes 1' is a sum of a width of the strip electrode 1' (recorded as $d_1$) and a width of the gap 2' (recorded as $d_2$).

Figure 2:
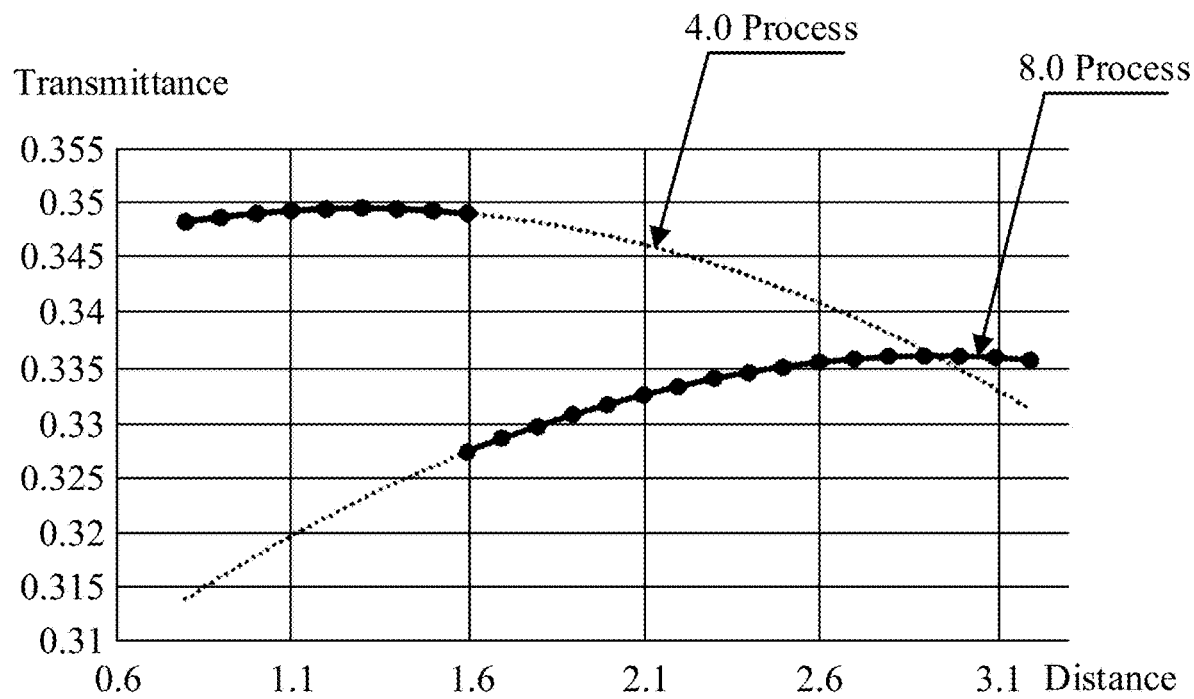
FIG. 2 is a schematic diagram showing a relation between transmittance of a display panel and a distance between strip electrodes under different processes.

FIG. 2 is a schematic diagram showing a relation between transmittance of a display panel and a distance between strip electrodes under different processes. As can be seen from FIG. 2, when process 4.0 is adopted, the less the distance between the strip electrodes is, the higher the transmittance of the display panel is. When process 8.0 is adopted, the greater the distance between the strip electrodes is, the higher the transmittance of the display panel is, but all the transmittances in the process 8.0 are lower than those in the process 4.0. Therefore, adopting process 4.0 may effectively improve the transmittance of the display panel.

However, in the prior art, resolution of a common exposure machine is mostly at the level of 3 μm. In a mask design process of high-generation line products, the problem of strip electrode breaking easily occurs in an exposure or etching process due to too fine $d_1$, and the problem of strip electrodes being bridged occurs during exposure due to too fine $d_2$. Therefore, it is difficult for the distance of the strip electrodes in the pixel electrode of the high-generation line product meet the design below 4.0. That is to say, under the limitation of existing production apparatuses, the distance between strip electrodes can only be reduced to a certain extent and cannot be further reduced.

In order to solve the above problems, embodiments of the disclosure provide an array substrate, a manufacturing method for the array substrate, a display panel, and a display device, which are described in detail below with reference to the accompanying drawings.

Figure 3:
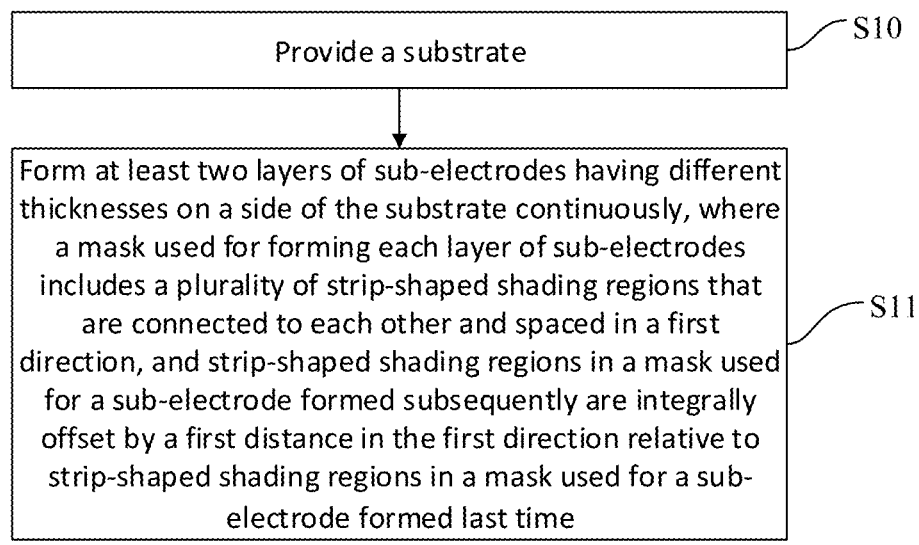
FIG. 3 shows a manufacturing method for an array substrate according to an embodiment of the disclosure.

FIG. 3 shows a manufacturing method for an array substrate according to an embodiment of the disclosure. The method includes:

S10, provide a substrate; and

S11, form at least two layers of sub-electrodes having different thicknesses on a side of the substrate continuously.

Mask used for forming each layer of sub-electrodes includes a plurality of strip-shaped shading regions that are connected to each other and spaced in a first direction. Strip-shaped shading regions in a mask used for sub-electrodes formed subsequently are integrally shifted by a first distance in the first direction relative to strip-shaped shading regions in a mask used for sub-electrodes formed last time.

The electrode may be a pixel electrode or a common electrode. One electrode corresponds to one pixel region.

Figure 4:
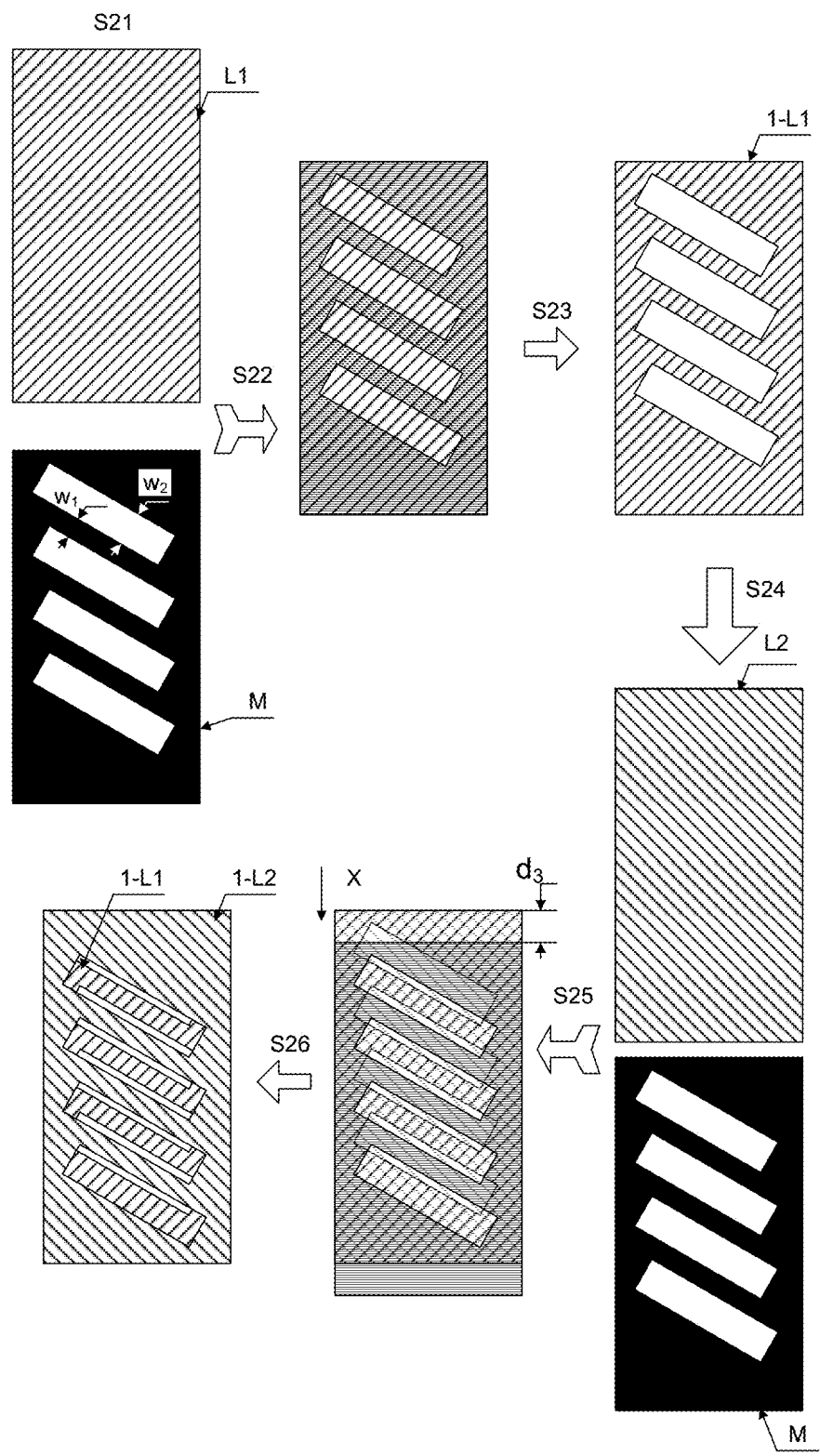
FIG. 4 is a flowchart of manufacturing an electrode in an array substrate according to an embodiment of the disclosure.

FIG. 4 is a flowchart of manufacturing an electrode in an array substrate according to an embodiment of the disclosure. Due to space limitation, FIG. 4 shows a partial mask and sub-pixel electrodes corresponding to one pixel region, and the electrode is composed of two layers of sub-electrodes as an example for description.

S21. Form a first electrode layer L1 having a first thickness on a side of a substrate.

S22. Transfer a pattern of a mask M to a surface of the first electrode layer L1.

The mask corresponding to each pixel region is provided with a plurality of strip-shaped shading regions that are connected to each other and arranged in a first direction X. A width $w_2$ of a gap between two adjacent strip-shaped shading regions is greater than a width $w_1$ of the strip-shaped shading region. The distance between two adjacent strip-shaped shading regions is $w_1+w_2$.

S23. Etch the first electrode layer L1 to which the pattern of the mask M is transferred, and obtain a first layer of sub-electrodes 1-L1.

S24. Form a second electrode layer L2 having a second thickness on a side of the first layer of sub-electrodes 1-L1 away from the substrate.

S25. Shift the mask M covering the first electrode layer L1 by a first distance $d_3$ in a first direction X, and then transfer the pattern of the shifted mask M to the second electrode layer L2.

S26. Etch the second electrode layer L2 to which the shifted mask M pattern is transferred, and obtain a second layer of sub-electrodes 1-L2.

The first electrode layer L1 and the second electrode layer L2 are made of a same material. First layer of sub-electrodes 1-L1 and second layer of sub-electrodes 1-L2 in a same pixel region together constitute an electrode corresponding to the pixel region.

The mask in FIG. 4 has three strip-shaped shading regions that are connected to each other. When a next layer of sub-electrodes are manufactured, the mask is shifted by the first distance $d_3$ in the first direction X from a position where the mask is used for the last layer of sub-electrodes, such that the strip-shaped shading regions of the mask fall into the gaps of the last layer of sub-electrodes, and the finally formed electrode has six strip electrodes. In this way, the distance between two adjacent strip electrodes in the pixel electrode is reduced without changing a process apparatus, such that the transmittance of the array substrate is improved. Since the distance between two adjacent strip-shaped shading regions in the mask that is used is an integer multiple of the distance between two adjacent strip electrodes in the finally obtained electrode, not only high-precision electrode can be manufactured by using a low-precision exposure machine, but also the risk that the strip electrodes are broken or bridged can be reduced.

In some embodiments, the step of forming at least two layers of sub-electrodes having different thicknesses on a side of the substrate continuously includes a forming method of any two adjacent layers of sub-electrodes:

form a first electrode layer having a first thickness;

pattern the first electrode layer with a first mask to obtain a plurality of sub-electrodes corresponding to the first electrode layer, where the sub-electrodes include a plurality of strip electrodes connected to each other and arranged in the first direction;

form a second electrode layer having a second thickness on a side of the plurality of sub-electrodes of the first electrode layer away from the substrate; and pattern the second electrode layer with a second mask to obtain a plurality of sub-electrodes corresponding to the second electrode layer.

In some embodiments, the first thickness is greater than the second thickness. By setting the first thickness of the first electrode layer to be greater than the second thickness of the second electrode layer, the situation that sub-electrodes of the first electrode layer of are broken by over-etching the sub-electrodes of the first electrode layer when etching the second electrode layer can be avoided.

In some other embodiments, the first thickness is at least twice the second thickness.

In some embodiments provided in the disclosure, setting the first thickness to be at least twice the second thickness can prevent a sub-pixel electrode formed earlier from breaking due to over-etching when a sub-pixel electrode formed subsequently is etched.

In some embodiments, the first thickness may range from 500 Å to 1000 Å, and the second thickness may range from 200 Å to 400 Å.

Figure 5:
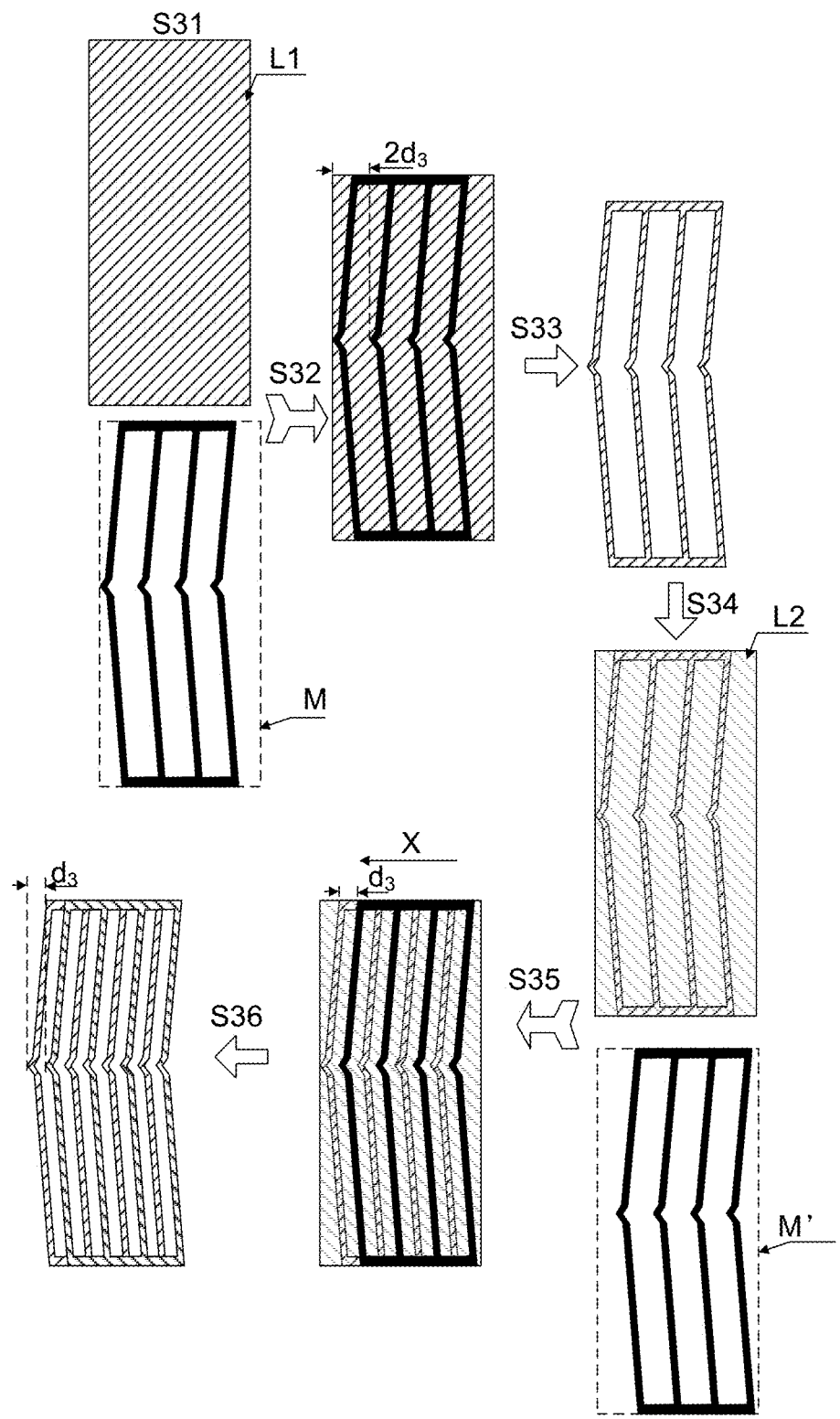
FIG. 5 is another flowchart of manufacturing an electrode in an array substrate according to an embodiment of the disclosure.

FIG. 5 is another flowchart of manufacturing an electrode in an array substrate according to an embodiment of the disclosure. In FIG. 5, an electrode having two layers of sub-pixel electrodes is manufactured as an example, and strip electrodes in the electrode are in a zigzag shape.

S31. Form a first electrode layer L1 having a first thickness on a side of a substrate.

S32. Transfer a pattern of a first mask M to a surface of the first electrode layer L1.

The mask M corresponding to each pixel region has a plurality of strip-shaped shading regions connected to each other and arranged in a first direction. A distance between two adjacent strip-shaped shading regions is $2d_3$.

S33. Etch the first electrode layer L1 to which the pattern of the first mask M is transferred to obtain a first layer of sub-electrodes 1-L1.

S34. Form a second electrode layer L2 having a second thickness on a side of the first layer of sub-electrodes 1-L1 away from the substrate.

S35. Transfer a pattern of a second mask M' to a surface of the second electrode layer L2.

In the first direction X, the plurality of shading regions of the second mask M' as a whole are shifted by $d_3$ relative to the plurality of shading regions of the first mask M. An orthographic projection of the plurality of shading regions of the second mask M' on the array substrate is located in gaps between two adjacent strip-shaped shading regions of the first mask M. In this way, an electrode similar to that shown in FIG. 4 can also be produced. Since the mask used for the second sub-electrodes 1-L2 does not need to move, alignment deviation generated when the mask moves can be reduced, and electrode production accuracy can be improved.

S36. Etch the second electrode layer L2 to which the second mask M' is transferred to obtain a second layer of sub-electrodes 1-L2.

As shown in FIG. 4, the first mask and the second mask are a same mask.

The second mask is shifted by the first distance relative to the first mask in the first direction X.

As shown in FIG. 5, the first mask and the second mask are different mask.

In the first direction X, a plurality of strip-shaped shading regions in the second mask are shifted by the first distance relative to a plurality of strip-shaped shading regions in the first mask.

In some embodiments, the step of patterning the first electrode layer with a first mask may be achieved as follows:
  form a first photoresist layer on a side of the first electrode layer away from the substrate;
  expose the first photoresist layer with a first exposure amount for a first duration based on the first mask (in this way, the pattern of the first mask is transferred to the surface of the first electrode layer);
  etch the first electrode layer based on the exposed first photoresist layer; and
  strip the exposed first photoresist layer, and anneal the etched first electrode layer (accordingly, the etched first electrode layer is crystallized).

The step of patterning the second electrode layer with a second mask may be achieved as follows:
  form a second photoresist layer on a side of the second electrode layer away from the substrate;
  expose the second photoresist layer with a second exposure amount for a second duration based on the second mask (in this way, the pattern of the second mask is transferred to the surface of the second electrode layer), where the second exposure amount is less than the first exposure amount, and the second duration is shorter than the first duration;
  etch the second electrode layer based on the exposed second photoresist layer; and
  strip the exposed second photoresist layer, and anneal the etched second electrode layer (accordingly, the second electrode layer is crystallized).

Figure 6:
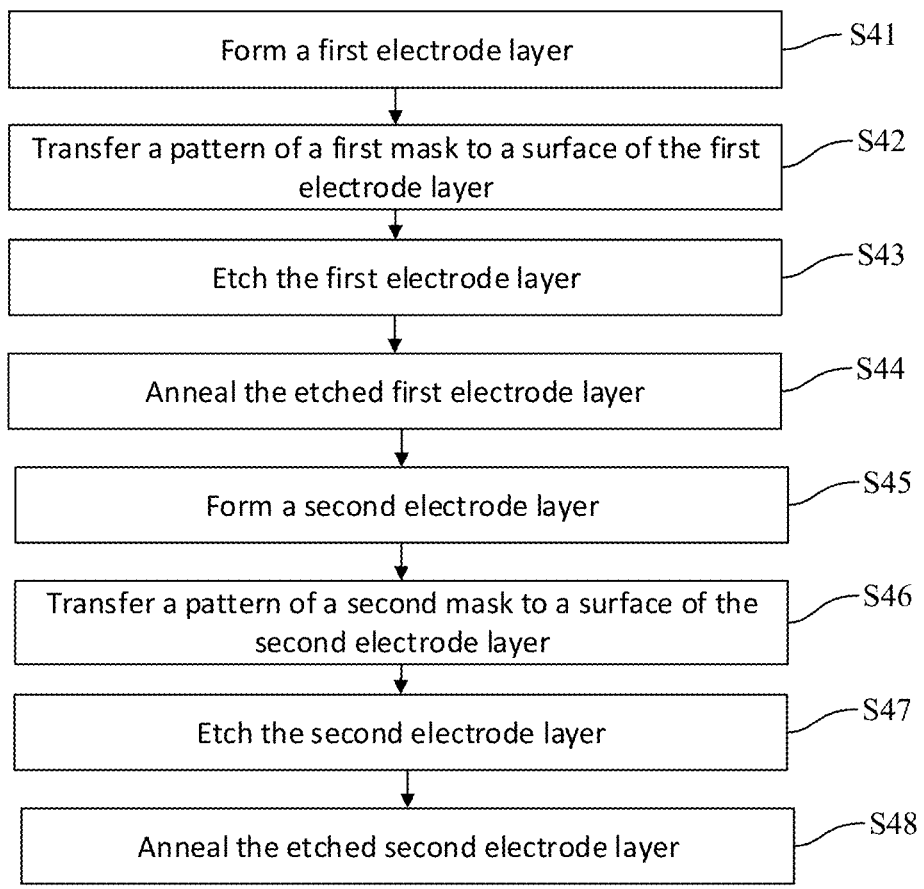
FIG. 6 is a schematic diagram of a process flow for manufacturing an electrode having two layers of sub-electrodes according to an embodiment of the disclosure.

FIG. 6 is a schematic diagram of a process flow for manufacturing an electrode having two layers of sub-electrodes according to an embodiment of the disclosure.

S41. Form a first electrode layer.

The first electrode layer has a thickness of 500 Å-1000 Å may be formed on a side of a substrate.

S42. Transfer a pattern of a first mask to a surface of the first electrode layer.

A first photoresist layer is formed on a side of the first electrode layer away from the substrate. The first photoresist layer is exposed and developed with a first exposure amount based on the first mask, such that the pattern of the first mask is transferred to the surface of a first electrode layer.

S43. Etch the first electrode layer.

The first electrode layer is etched for a first duration based on the exposed first photoresist layer. The first duration may range from 140 s to 200 s. The exposed first photoresist layer is stripped after the first electrode layer is etched.

S44. Anneal the etched first electrode layer.

The etched first electrode layer is annealed, so that the etched first electrode layer is crystallized.

S45. Form a second electrode layer.

The second electrode layer having a thickness of 200 Å-400 Å may be formed on a side of the crystallized first electrode layer away from the substrate.

S46. Transfer a pattern of a second mask to a surface of the second electrode layer.

A second photoresist layer is coated on a surface of the second metal layer away from the substrate. The second photoresist layer is exposed with a second exposure amount based on the second mask. The second exposure amount is less than the first exposure amount, such that the pattern of the second mask may be transferred to the surface of the second metal layer.

In a case that the second mask and the first mask are the same mask, the mask used for the second metal layer is set after the first mask is shifted by the first distance in the first direction.

S47. Etch the second electrode layer.

The second electrode layer is etched for a second duration based on the exposed second photoresist layer. The second duration is shorter than the first duration, and the second duration may range from 80 s to 100 s.

S48. Anneal the etched second electrode layer.

Annealing the etched second electrode layer may crystallize the second electrode layer.

In some embodiments, after the exposed first photoresist layer is stripped and before the etched first electrode layer is annealed, the method further includes: form a third photoresist layer on a surface of the etched first electrode layer away from the substrate; shift the first mask by a second distance in the first direction relative to a previous position, and etch the third photoresist layer with the first exposure amount based on the shifted first mask, where the second distance is less than a width of the strip-shaped shading region; etch the etched first electrode layer based on the exposed third photoresist layer; and strip the exposed third photoresist layer. That is to say, after S43 of etching the first electrode layer and stripping the photoresist thereon, the first mask is shifted from the original position by the second distance in the first direction, then S42 and S43 are repeated, and finally the etched first electrode layer (that is, the first metal layer after the second etching) is annealed.

After the exposed second photoresist layer is stripped and before the etched second electrode layer is annealed, the method further includes: form a fourth photoresist layer on a surface of the etched second electrode layer away from the substrate; shift the second mask by the second distance in the first direction relative to a previous position, and etch the fourth photoresist layer with the second exposure amount based on the shifted second mask; etch the etched second electrode layer based on the exposed fourth photoresist layer; and strip the exposed fourth photoresist layer. That is to say, after S47 of etching the second electrode layer and stripping the photoresist thereon, the second mask is shifted from the original position by the second distance in the first direction, then S45 and S46 are repeated, and finally the etched second electrode layer (that is, the second metal layer after the second etching) is annealed.

It should be understood that the first electrode layer and the second electrode layer are patterned the same number of times by using the first mask and the second mask.

Figure 7:
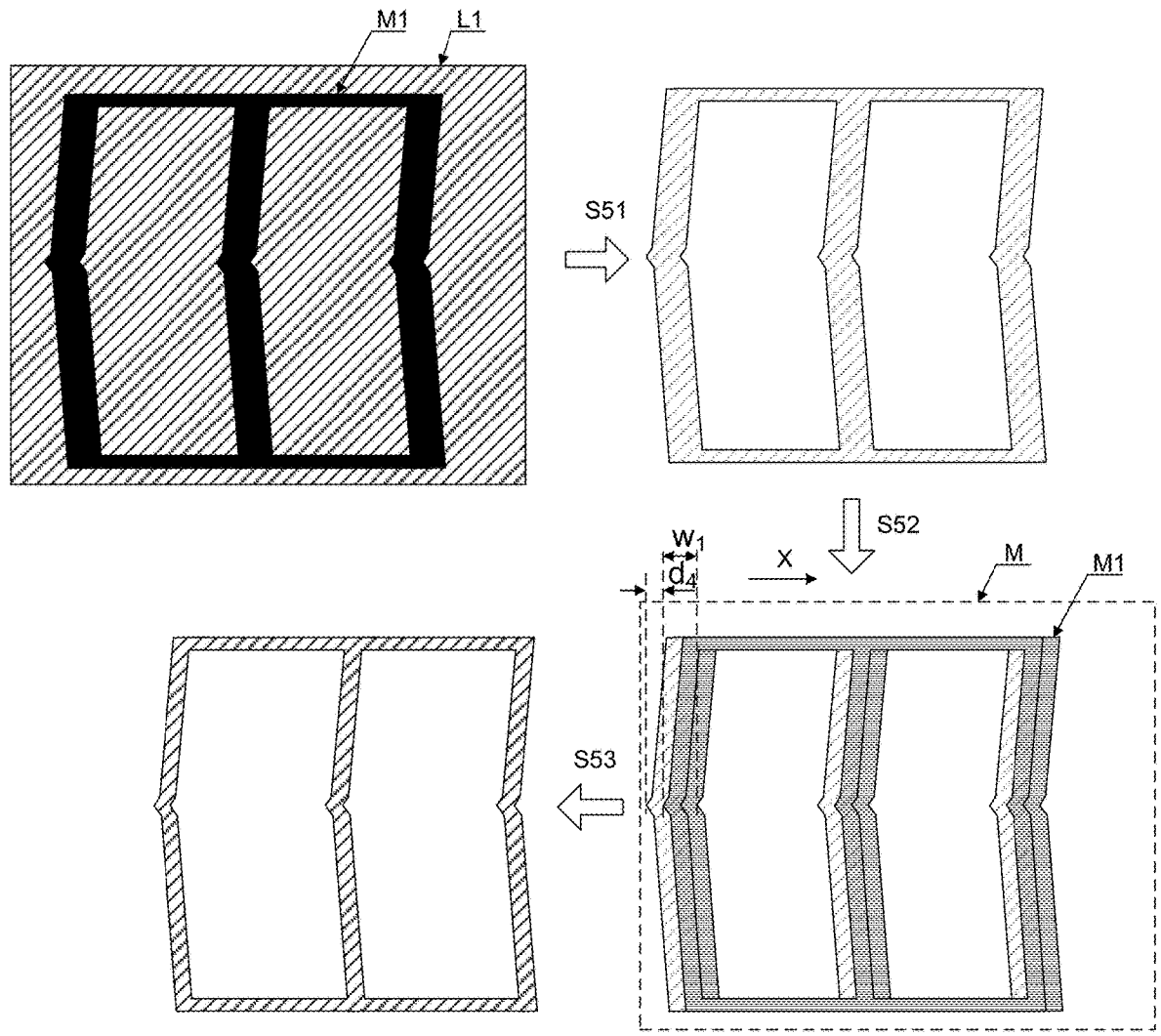
FIG. 7 is a schematic diagram of manufacturing an electrode according to an embodiment of the disclosure.

FIG. 7 is a schematic diagram of manufacturing an electrode according to an embodiment of the disclosure.

S51. Pattern a first electrode layer for the first time based on a first mask to obtain a first electrode layer patterned once.

S52. Shift the first mask by a second distance $d_4$ in a first direction X based on a position of the first electrode layer subjected to patterning for the first time. The second distance $d_4$ is less than the width $w_1$ of the strip-shaped shading region.

S53. Pattern the first electrode layer patterned once again based on the shifted first mask, to obtain a plurality of sub-electrodes of the first electrode layer.

Since the strip-shaped shading regions in the shifted first mask cover part of the strip electrodes, the other part of the strip electrodes which are not covered by the strip-shaped shading regions in the shifted first mask after the first electrode layer patterned once are patterned by the shifted first mask are partially etched, such that the width of the strip electrode can be reduced, and the distance between two adjacent strip electrodes can also be increased, but the distance between two adjacent strip electrodes is unchanged. In this way, the width of the strip electrode in the sub-electrode can be reduced, and a gap width between two adjacent strip electrodes in the sub-electrode can be increased, such that the first distance can be reduced. Accordingly, one gap in the sub-electrode can accommodate more strip electrodes of the sub-electrodes of other layers, and the distance between adjacent strip electrodes in the finally formed electrode can be further reduced.

S52 to S53 may be modified to: pattern the first electrode layer patterned once again based on the third mask, to obtain a plurality of sub-electrodes of the first electrode layer.

In embodiments provided in the disclosure, when any layer of sub-electrodes are manufactured, a corresponding electrode layer is patterned twice continuously, the strip-shaped shading region in the mask used for patterning twice is shifted by the second distance in the first direction X integrally, and the second distance is less than the width of the strip-shaped shading region, such that the width of the strip electrode in the prepared electrode is shorter. Moreover, since the width of the strip-shaped shading region in the mask that is used is wider, the strip electrode can be effectively prevented from being broken. The electrode with higher precision than that of the exposure apparatus that is used can be manufactured through the solution, such that the precision requirement on the exposure apparatus can be reduced, and the apparatus cost can be effectively reduced.

Figure 8:
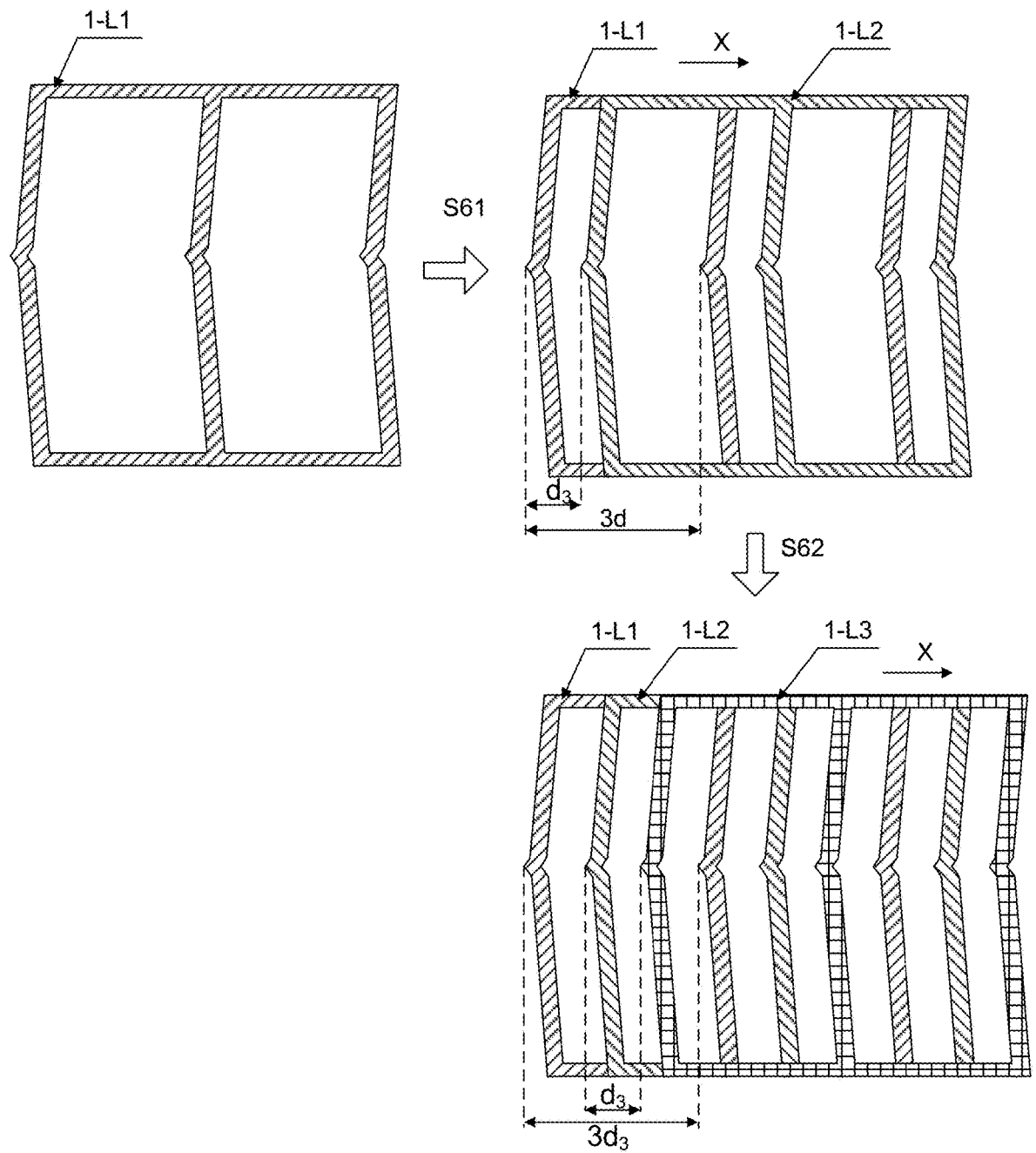
FIG. 8 is a schematic diagram of manufacturing an electrode having three layers of sub-electrodes according to an embodiment of the disclosure.

FIG. 8 is a schematic diagram of manufacturing an electrode having three layers of sub-electrodes according to an embodiment of the disclosure.

S61. Form a first layer of sub-electrodes 1-L1 based on a first mask.

S62. Form a second layer of sub-electrodes 1-L2 based on a second mask.

S63. Form a third layer of sub-electrodes 1-L3 of based on a third mask.

The first mask, the second mask, and the third mask may be the same mask. The second mask is a mask obtained after the first mask is shifted by a first distance $d_3$ in a first direction X integrally, and the third mask is a mask obtained after the second mask is shifted by the first distance $d_3$ in the first direction X integrally. In this way, only one mask can be used to manufacture an electrode with higher accuracy than that of an exposure apparatus used, such that production costs and apparatus costs are effectively reduced.

The first mask, the second mask, and the third mask may be different mask. An orthographic projection of a plurality of strip-shaped shading regions in the second mask on a substrate are obtained after an orthographic projection of a plurality of strip-shaped shading regions in the first mask on a substrate is shifted by the first distance $d_3$ in the first direction integrally, and an orthographic projection of a plurality of strip-shaped shading regions in the third mask on a substrate are obtained after an orthographic projection of a plurality of strip-shaped shading regions in the second mask on a substrate is shifted by the first distance $d_3$ in the first direction integrally. In this way, a shift error is reduced.

The different layers of sub-electrodes may be patterned once with a corresponding mask(s), or patterned at least twice in succession as shown in FIG. 7.

In a case that an electrode containing more layers of sub-electrodes needs to be manufactured, the solution described above can be repeated in turn, which is not repeated herein.

In some embodiments, the first distance is a ratio of a distance between two adjacent strip-shaped shading regions in the mask in the first direction to a number of layers of the sub-electrodes.

For example, in FIG. 8, in the first direction X, the distance between two adjacent strip-shaped shading regions in the mask is $3d_3$, one electrode is composed of three layers of sub-electrodes, and the first distance $d_3=3d_3/3$.

Figure 9:
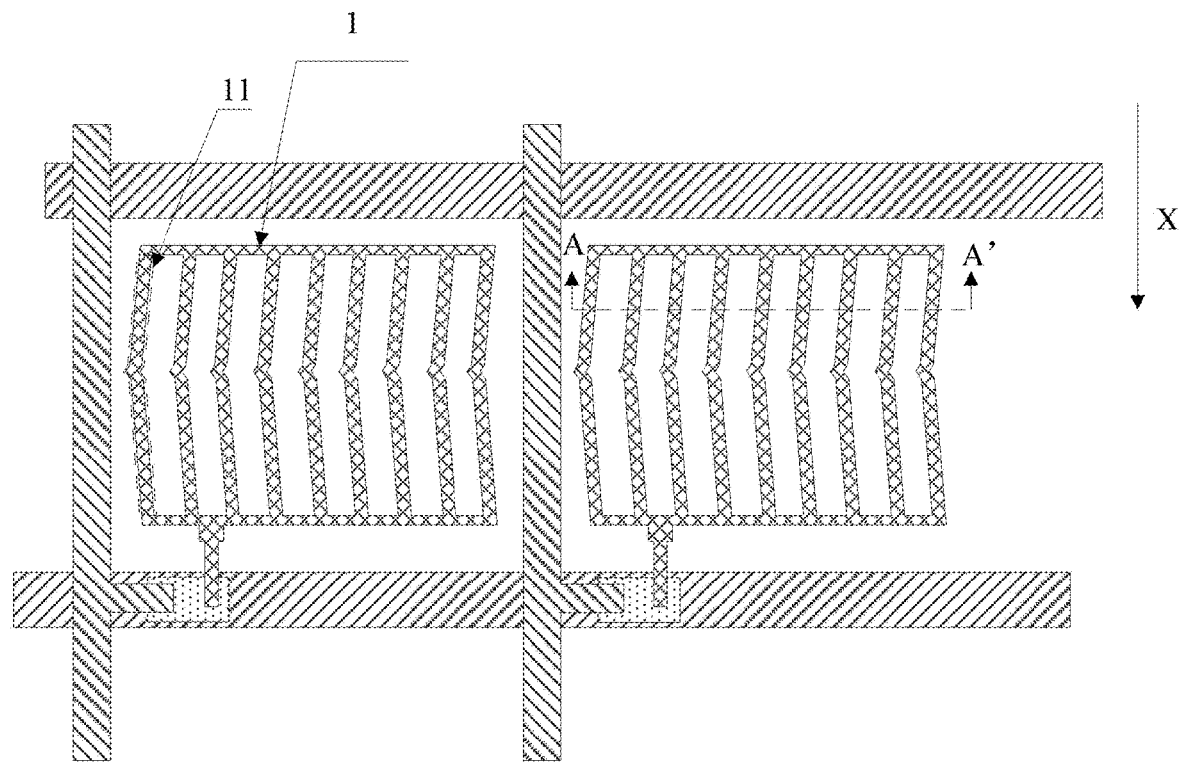
FIG. 9 is a top view of an array substrate according to an embodiment of the disclosure.
Figure 10:
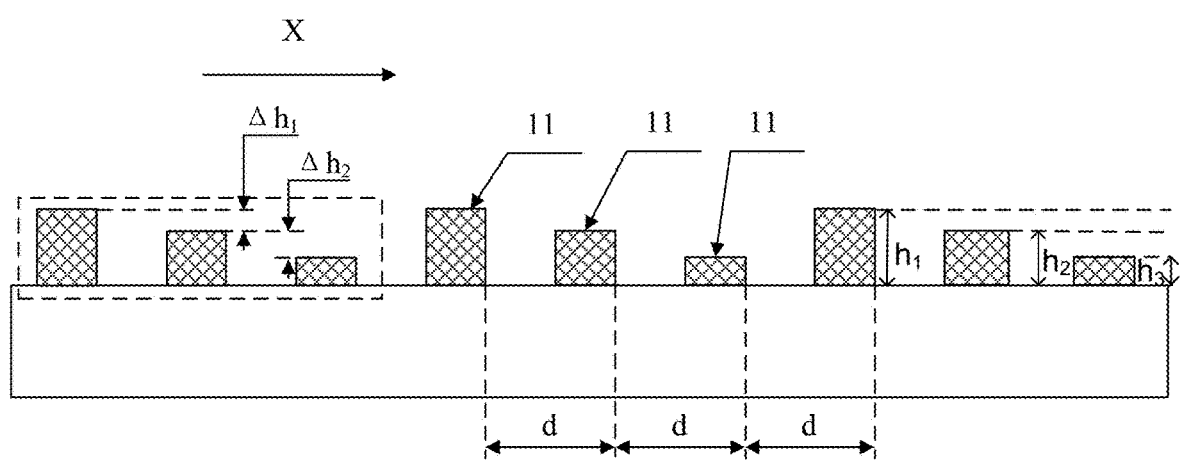
FIG. 10 is a sectional view along direction AA' in FIG. 9 according to an embodiment of the disclosure.

Based on the same inventive concept, with reference to FIGS. 9 and 10, FIG. 9 is a top view of an array substrate according to an embodiment of the disclosure; and FIG. 10 is a sectional view along direction AA' in FIG. 9 according to an embodiment of the disclosure. Embodiments of the disclosure provide an array substrate manufacturing through the manufacturing method described above. The array substrate includes: a plurality of electrodes 1 arranged in an array.

The electrode 1 includes a plurality of strip electrodes 11 that are connected to each other and spaced, the plurality of strip electrodes 11 at least have two thicknesses, and a distance between two adjacent strip electrodes is less than a preset value.

In some embodiments, the preset value is less than 4 µm.

For example, the electrode 1 shown in FIG. 9 is manufactured through the manufacturing method shown in FIG. 8. The electrode 1 is composed of three layers of sub-electrodes 1 shown in FIG. 8, and the thickness of each layer of sub-electrodes 1 is different. Therefore, the electrode 1 may have three types of thicknesses (h1, h2, h3) as shown in FIG. 10. In a case that the electrode 1 is composed of two layers of sub-electrodes 1, and the thickness of each layer of sub-electrodes 1 is different, the electrode 1 has two types of thicknesses.

In the embodiments provided in the disclosure, since the plurality of strip electrodes 11 of the electrode 1 have at least two types of thicknesses, the electrode 1 can be prepared by using electrode layers with a same number of layers as the thickness type and using a mask with a distance between two adjacent shading regions to be greater than a distance between two adjacent strip electrodes in the electrode 1. Moreover, since the distance between two adjacent strip electrodes in the electrode 1 is less than the preset value, a high-precision electrode 1 can be manufactured by using a low-precision exposure machine, and the transmittance of the electrode 1 is also effectively improved.

With further reference to FIG. 10, in the arrangement direction of the plurality of strip electrodes 11, the plurality of strip electrodes 11 constitute a plurality of strip electrode groups arranged repeatedly. The three strip electrodes 11 shown in a dotted line box in FIG. 10 constitute one strip electrode group.

Thicknesses of the strip electrodes 11 in the strip electrode groups gradually increase or decrease in an arrangement mode of the plurality of strip electrodes 11.

In FIG. 10, the plurality of strip electrodes 11 are arranged in an extended direction of a gate line. The extended direction of the gate line may be regarded as the first direction or a direction opposite the first direction shown in FIG. 10. The thicknesses of the three strip electrodes 11 in the strip electrode group decrease gradually in the first direction, and the thicknesses of the three strip electrodes 11 in the strip electrode group increase gradually in the direction opposite the first direction.

In the embodiments provided in the disclosure, in the arrangement direction of the plurality of strip electrodes 11, the plurality of strip electrodes 11 form a plurality of strip electrode groups arranged repeatedly, and the thicknesses of the strip electrodes 11 in the strip electrode group gradually increase or decrease, such that strip electrodes 11 formed earlier can be prevented from being broken when strip electrodes 11 of different layers are formed, such that a yield of the array substrate can be effectively improved.

In some embodiments, a thickness difference between two adjacent strip electrodes 11 in the strip electrode group ranges from 50 Å to 800 Å.

As shown in FIG. 10, in the first direction, a thickness difference between the first strip electrode 11 and the second strip electrode 11 in the strip electrode group is $\Delta h_1$, a thickness difference between the second strip electrode 11 and the third strip electrode 11 is $\Delta h_2$, and $\Delta h_1$ and $\Delta h_2$ ranges from 50 Å to 800 Å.

In embodiments provided in the disclosure, by setting the thickness difference between two adjacent strip electrodes 11 in the strip electrode group to be 50 Å-800 Å, a strip electrode 11 formed earlier can be prevented from being over-etched in the etching process, which causes the electrode 1 to be broken.

In some embodiments, a distance between two adjacent strip electrodes 11 is substantially identical in the arrangement direction of the plurality of strip electrodes 11.

As shown in FIG. 10, the distance between two adjacent strip electrodes 11 is designed to be d during design, but due to some apparatus errors of apparatus used and some errors in alignment of the mask, the distance between two adjacent strip electrodes 11 in the first direction X is not exactly d, but approximately d.

In embodiments provided in the disclosure, the pixel electrode 1 may generate a uniform electric field by making the distance between two adjacent strip electrodes 11 approximately the same.

Figure 11:
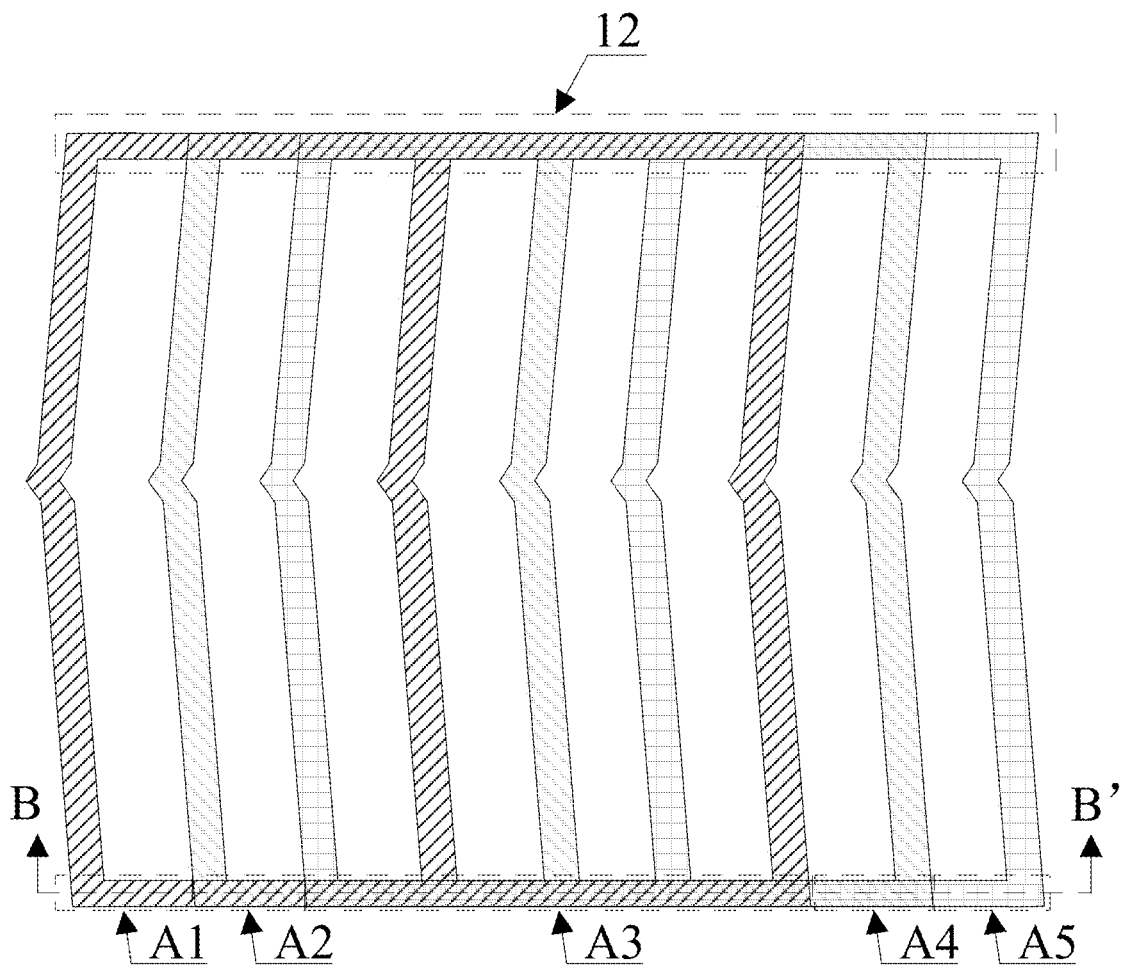
FIG. 11 is a schematic structural diagram of an electrode according to an embodiment of the disclosure.

FIG. 11 is a schematic structural diagram of an electrode according to an embodiment of the disclosure. The electrode 1 in FIG. 11 is an electrode 1 prepared through the method in FIG. 8. For convenience of understanding, FIG. 11 shows different layers of sub-electrodes 1 of the electrode 1, and sub-electrodes 1 located at an upper layer are semi-transparent. The electrode 1 further includes a frame 12. Two ends of the strip electrodes 11 are connected to the frame 12 separately.

Figure 12:
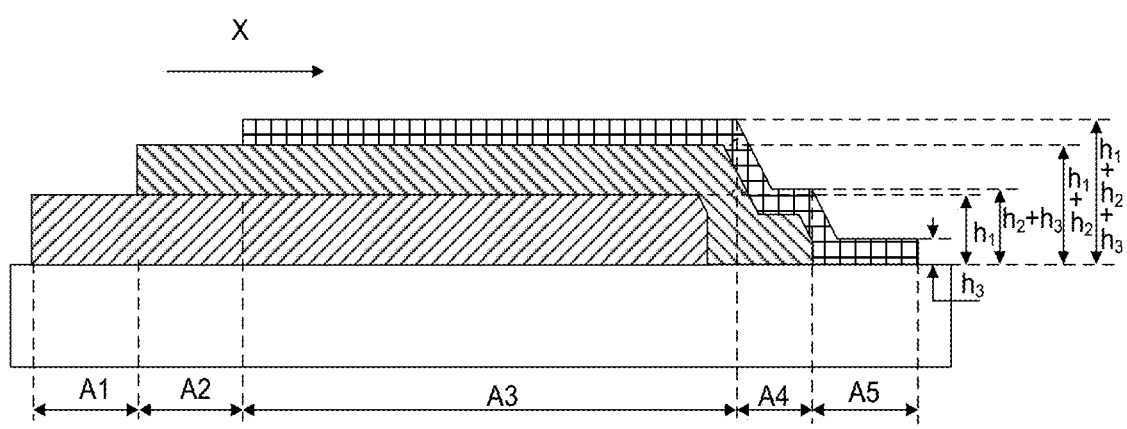
FIG. 12 is a sectional view along direction BB' in FIG. 11 according to an embodiment of the disclosure.

FIG. 12 is a sectional view along direction BB' in FIG. 11 according to an embodiment of the disclosure. The frame 12 has different thicknesses in different regions, and a number of thickness types of the frame 12 is greater than a number of thickness types of the plurality of strip electrodes 11.

Since the thickness of each layer of sub-electrodes 1 is different when the electrode 1 in FIG. 11 is manufactured, and each layer of sub-electrodes 1 is displaced by the first distance in the first direction X, the different layers of sub-electrodes 1 overlap differently in the first direction, such that the thicknesses of the regions A1-A5 of the frame 12 in FIG. 11 are different.

For example, the thickness of the region A1 is the thickness $h_1$ of the first layer of sub-electrodes 1. The thickness of the region A2 is a sum of the thickness $h_1$ of the first layer of sub-electrodes 1 and the thickness $h_2$ of the second layer of sub-electrodes 1 (that is, $h_1+h_2$). The thickness of the region A3 is a sum of the thickness $h_1$ of the first layer of sub-electrodes 1, the thickness $h_2$ of the second layer of sub-electrodes 1, and the thickness $h_3$ of the third layer of sub-electrode 1 (that is, $h_1+h_2+h_3$). The thickness of the region A4 is a sum of the thickness $h_2$ of the second layer of sub-electrodes 1 and the thickness $h_3$ of the third layer of sub-electrodes 1 (that is, $h_2+h_3$). The thickness of the region A5 is the thickness $h_3$ of the third layer of sub-electrodes 1.

In some embodiments, a thickness of a thickest position of the frame 12 is a sum of thicknesses corresponding to all thickness types of the plurality of strip electrodes 11.

Based on the same inventive concept, embodiments of the disclosure provide a display panel. The display panel includes the array substrate above.

The display panel may be a liquid crystal display panel or an electroluminescent display panel.

Based on the same inventive concept, embodiments of the disclosure provide a display device. The display device includes the display panel above.

The display device may be a liquid crystal display device, such as a liquid crystal display, a liquid crystal display screen, a liquid crystal television, etc., and may also be an electroluminescent display device, such as an electroluminescent display, an electroluminescent display screen, an electroluminescent television, etc. of which product expression forms may be a mobile phone, a tablet computer, a notebook, etc.

While the preferred embodiments of the disclosure have been described, additional alterations and modifications to those embodiments may be made by those skilled in the art once the basic inventive concept is learnt by those skilled in the art. Thus, the appended claims are intended to be interpreted to include the preferred embodiments and all alterations and modifications that fall within the scope of the disclosure.

Apparently, those skilled in the art can make various amendments and variations to the disclosure without departing from the spirit and scope of the disclosure. In this way, if modifications and variations to the disclosure fall within the scope of the claims of the disclosure and their equivalents, it is intended that the disclosure also encompass these amendments and variations.

What is claimed is:

1. An array substrate, comprising:
   a plurality of electrodes arranged in an array, wherein the electrode comprises a plurality of strip electrodes that are connected to each other and spaced, the plurality of strip electrodes at least have two thicknesses, and a distance between two adjacent strip electrodes is less than a preset value;

the plurality of strip electrodes constitute a plurality of strip electrode groups arranged repeatedly in an arrangement direction of the plurality of strip electrodes; and a thickness difference between two adjacent strip electrodes in the strip electrode group ranges from 50 Å to 800 Å.

2. The array substrate according to claim 1, wherein thicknesses of the strip electrodes in the strip electrode group gradually increase or decrease in an arrangement mode of the plurality of strip electrodes.

3. The array substrate according to claim 1, wherein a distance between two adjacent strip electrodes is substantially identical in the arrangement direction of the plurality of strip electrodes.

4. The array substrate according to claim 1, wherein the electrode further comprises a frame, and two ends of the strip electrodes are connected to the frame separately.

5. The array substrate according to claim 4, wherein the frame has different thicknesses in different regions, and a number of thickness types of the frame is greater than a number of thickness types of the plurality of strip electrodes.

6. The array substrate according to claim 5, wherein a thickness of a thickest position of the frame is a sum of thicknesses corresponding to all thickness types of the plurality of strip electrodes.

7. The array substrate according to claim 1, wherein the preset value is less than 4 µm.

8. A manufacturing method for the array substrate according to claim 1, comprising:

providing a substrate; and forming at least two layers of sub-electrodes having different thicknesses on a side of the substrate continuously, wherein a mask used for forming each layer of sub-electrodes comprises a plurality of strip-shaped shading regions that are connected to each other and spaced in a first direction, and strip-shaped shading regions in a mask used for sub-electrodes formed subsequently are integrally shifted by a first distance in the first direction relative to strip-shaped shading regions in a mask used for sub-electrodes formed last time.

9. The manufacturing method according to claim 8, wherein said forming at least two layers of sub-electrodes having different thicknesses on a side of the substrate continuously comprises:

a forming method for any two adjacent layers of sub-electrodes, comprising:

forming a first electrode layer having a first thickness;

obtaining a plurality of sub-electrodes corresponding to the first electrode layer by patterning the first electrode layer with a first mask, wherein the sub-electrode comprise a plurality of strip electrodes connected to each other and arranged in the first direction;

forming a second electrode layer having a second thickness on a side of the plurality of sub-electrodes of the first electrode layer away from the substrate; and obtaining a plurality of sub-electrodes corresponding to the second electrode layer by patterning the second electrode layer with a second mask.

10. The manufacturing method according to claim 9, wherein said patterning the first electrode layer with a first mask comprises:

forming a first photoresist layer on a side of the first electrode layer away from the substrate;

exposing the first photoresist layer with a first exposure amount for a first duration based on the first mask;

etching the first electrode layer based on the exposed first photoresist layer; and stripping the exposed first photoresist layer, and annealing the etched first electrode layer.

11. The manufacturing method according to claim 9, wherein the first mask and the second mask are a same mask; and the second mask is shifted by the first distance relative to the first mask in the first direction.

12. The manufacturing method according to claim 9, wherein the first mask and the second mask are different masks; and in the first direction, a plurality of strip-shaped shading regions in the second mask are shifted by the first distance relative to a plurality of strip-shaped shading regions in the first mask.

13. The manufacturing method according to claim 10, wherein said patterning the second electrode layer with a second mask comprises:

forming a second photoresist layer on a side of the second electrode layer away from the substrate;

exposing the second photoresist layer with a second exposure amount for a second duration based on the second mask, wherein the second exposure amount is less than the first exposure amount, and the second duration is shorter than the first duration;

etching the second electrode layer based on the exposed second photoresist layer; and stripping the exposed second photoresist layer, and annealing the etched second electrode layer.

14. The manufacturing method according to claim 13, wherein:

after the stripping the exposed first photoresist layer and before the annealing the etched first electrode layer, the method further comprises:

forming a third photoresist layer on a surface of a side of the etched first electrode layer away from the substrate;

shifting the first mask by a second distance relative to a previous position in the first direction, and etching the third photoresist layer with the first exposure amount based on the shifted first mask, wherein the second distance is less than a width of the strip-shaped shading region;

etching the etched first electrode layer based on the exposed third photoresist layer; and stripping the exposed third photoresist; and after the stripping the exposed second photoresist layer and before the annealing the etched second electrode layer, the method further comprises:

forming a fourth photoresist layer on a surface of a side of the etched second electrode layer away from the substrate;

shifting the second mask by the second distance relative to a previous position in the first direction, and etching the fourth photoresist layer with the second exposure amount based on the shifted second mask;

etching the etched second electrode layer based on the exposed fourth photoresist layer; and stripping the exposed fourth photoresist layer.

15. The manufacturing method according to claim 8, wherein the first distance is a ratio of a distance between two adjacent strip-shaped shading regions in the mask in the first direction to a number of layers of the sub-electrodes.

16. A display panel, comprising the array substrate according to claim 1.

17. A display device, comprising the display panel according to claim 16.

18. An array substrate, comprising:
a plurality of electrodes arranged in an array, wherein
the electrode comprises a plurality of strip electrodes that are connected to each other and spaced, the plurality of strip electrodes at least have two thicknesses, and a distance between two adjacent strip electrodes is less than a preset value;
the electrode further comprises a frame, and two ends of the strip electrodes are connected to the frame separately;
the frame has different thicknesses in different regions, and a number of thickness types of the frame is greater than a number of thickness types of the plurality of strip electrodes.

19. The array substrate according to claim 18, wherein a thickness of a thickest position of the frame is a sum of thicknesses corresponding to all thickness types of the plurality of strip electrodes.

20. The array substrate according to claim 18, wherein the plurality of strip electrodes constitute a plurality of strip electrode groups arranged repeatedly in an arrangement direction of the plurality of strip electrodes; and
thicknesses of the strip electrodes in the strip electrode group gradually increase or decrease in an arrangement mode of the plurality of strip electrodes.

\* \* \* \* \*